US012759264B2

(12) United States Patent
Hedegaard et al.

(10) Patent No.: US 12,759,264 B2
(45) Date of Patent: Oct. 13, 2026

(54) ARTICLES CONTAINING ADHESIVE COMPOSITIONS EXHIBITING ON-DEMAND DEBONDING BEHAVIOR

(71) Applicant: 3M INNOVATIVE PROPERTIES COMPANY, St. Paul, MN (US)

(72) Inventors: Aaron T. Hedegaard, Woodbury, MN (US); Mahfuza B. Ali, Mendota Heights, MN (US); Ibrahim A. El Hedok, Concord, NC (US); Jason D. Clapper, Lino Lakes, MN (US); Eric J. Olson, Prior Lake, MN (US); Lindsey Hines, Stillwater, MN (US); Ross E. Behling, Woodbury, MN (US); Kevin D. Hagen, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 414 days.

(21) Appl. No.: 18/564,643

(22) PCT Filed: May 13, 2022

(86) PCT No.: PCT/IB2022/054475

§ 371 (c)(1),
(2) Date: Nov. 28, 2023

(87) PCT Pub. No.: WO2022/254267

PCT Pub. Date: Dec. 8, 2022

(65) Prior Publication Data

US 2024/0253329 A1 Aug. 1, 2024

Related U.S. Application Data

(60) Provisional application No. 63/202,300, filed on Jun. 4, 2021.

(51) Int. Cl.
*B32B 7/06* (2019.01)
*B32B 3/30* (2006.01)
(Continued)

(52) U.S. Cl.
CPC .................. *B32B 7/06* (2013.01); *B32B 3/30* (2013.01); *B32B 5/18* (2013.01); *B32B 7/025* (2019.01);
(Continued)

(58) Field of Classification Search
CPC .. B32B 7/025; B32B 7/04; B32B 7/06; B32B 7/12; C09J 133/00; C09J 133/02;
(Continued)

(56) References Cited

U.S. PATENT DOCUMENTS 4,798,201 A 1/1989 Rawlings et al.
5,290,615 A 3/1994 Tushaus et al.
(Continued)

FOREIGN PATENT DOCUMENTS

JP 2010037355 A 2/2010
JP 2020164778 A 10/2020
(Continued)

OTHER PUBLICATIONS

Banea, "Smart Adhesive Joints: An Overview of Recent Developments", The Journal of Adhesion, 2014, vol. 90, No. 01, pp. 16-40.
(Continued)

*Primary Examiner* — Zachary M Davis
(74) *Attorney, Agent, or Firm* — Ann Benjamin; Lynn R. Hunsberger

(57) ABSTRACT

An article comprising a first component having a first electrically conductive surface and a second component having a second surface. An adhesive composition comprising a zwitterionic polymer is disposed between the first electrically conductive surface and second surface and joins
(Continued)

the first component to the second component. The effort required to separate the first component from the second component, as measured by work of adhesion per surface area, is reduced by application of a DC electric potential across the adhesive composition.

19 Claims, 4 Drawing Sheets

(51) Int. Cl.

| | |
|---|---|
| ***B32B 5/18*** | (2006.01) |
| ***B32B 7/025*** | (2019.01) |
| ***B32B 7/12*** | (2006.01) |
| ***B32B 43/00*** | (2006.01) |
| ***C09J 5/00*** | (2006.01) |
| ***C09J 7/20*** | (2018.01) |
| ***C09J 7/38*** | (2018.01) |
| ***C09J 133/08*** | (2006.01) |

(52) U.S. Cl.
CPC .............. *B32B 7/12* (2013.01); *B32B 43/006* (2013.01); *C09J 5/00* (2013.01); *C09J 7/20* (2018.01); *C09J 7/385* (2018.01); *C09J 133/08* (2013.01); *B32B 2250/03* (2013.01); *B32B 2307/202* (2013.01); *B32B 2307/748* (2013.01); *B32B 2405/00* (2013.01); *C09J 2301/1242* (2020.08); *C09J 2301/302* (2020.08); *C09J 2301/314* (2020.08); *C09J 2301/502* (2020.08); *C09J 2433/00* (2013.01)

(58) Field of Classification Search
CPC ...... C09J 133/04; C09J 133/06; C09J 133/08; C09J 133/10; C09J 133/12
See application file for complete search history.

(56) References Cited

U.S. PATENT DOCUMENTS

| | | | |
|---|---|---|---|
| 6,620,308 | B2 | 9/2003 | Gilbert |
| 7,968,188 | B2 | 6/2011 | Gilbert |
| 8,383,721 | B2 | 2/2013 | Lewandowski et al. |
| 2008/0196828 | A1 | 8/2008 | Gilbert |
| 2014/0374032 | A1 | 12/2014 | Heucher |
| 2018/0265750 | A1 | 9/2018 | Akamatsu |
| 2018/0305593 | A1 | 10/2018 | Akamatsu et al. |
| 2019/0338164 | A1 | 11/2019 | El Hedok |
| 2020/0299548 | A1 | 9/2020 | Rachwal et al. |
| 2024/0191108 | A1 * | 6/2024 | Stapf .................. C08G 18/6696 |

FOREIGN PATENT DOCUMENTS

| | | | |
|---|---|---|---|
| JP | 2021504447 | A | 2/2021 |
| WO | 2008150227 | A1 | 12/2008 |
| WO | 2014093375 | A1 | 6/2014 |
| WO | 2014157408 | A1 | 10/2014 |
| WO | 2018102267 | A1 | 6/2018 |

OTHER PUBLICATIONS

Electrelease™, "Electrically-Debonding Adhesive Homepage", http://www.eiclabs.com/ERhome.htm, 2004, 1 page.
Haydon, "ElectRelease—Electrically Disbonding Epoxy Adhesive", Assembly Automation, 2002, vol. 22, No. 04, pp. 326-329.
International Search Report for PCT International Application No. PCT/IB2022/054475, mailed on Aug. 10, 2022, 4 pages.
Leijonmarck, "Electrochemical Characterization of Electrically Induced Adhesive Debonding", Journal of The Electrochemical Society, 2011, vol. 158, No. 10, pp. P109-P114.
Leijonmarck, "Electrolytically Assisted Debonding of Adhesives: An Experimental Investigation", International Journal of Adhesion & Adhesives, 2012, vol. 32, pp. 39-45.

* cited by examiner

ARTICLES CONTAINING ADHESIVE COMPOSITIONS EXHIBITING ON-DEMAND DEBONDING BEHAVIOR

CROSS REFERENCE TO RELATED APPLICATIONS

This application is a national stage filing under 35 U.S.C. 371 of PCT/IB2022/054475, filed May 13, 2022, which claims the benefit of U.S. Provisional Patent Application No. 63/202,300, filed Jun. 4, 2021, the disclosure of which is incorporated by reference in its/their entirety herein.

FIELD OF INVENTION

The present invention relates broadly to articles containing two or more components joined together by a pressure sensitive adhesive exhibiting on-demand debonding behavior, more particularly articles that can be separated into two or more components by application of an electric potential across the pressure sensitive adhesive.

BACKGROUND

Adhesives, including pressure-sensitive adhesives (PSAs), are commonly used to bond parts to assembled articles in a variety of industries, including the electronics, automobile, aerospace, abrasive, medical device, and packaging industries. The bond strength of the PSA between components in an article is critical to achieving the desired performance characteristic for a particular application. In many applications, the PSA must exhibit a high peel strength to prevent separation or debonding of components during use. For example, a PSA may be used in the automobile industry to bond trim to the side of a car or truck. In other applications, the PSA must be reworkable or repositionable. Typically, such PSAs adhere more strongly to one component than to another component, thus allowing repositioning or replacement of the component to which the adhesive more strongly adheres. For example, PSAs may be used to bond a protective cover to an electronic device, such as a cellular phone, a personal computer or a computer tablet. Due to the high cost of the articles and relatively low cost of the protective cover, it is sometimes desirable to remove the cover (debond it) for repair of the article, for modification of the article, for repositioning of the backing on the article, or for recycling of the bonded article.

SUMMARY

A need exists for articles containing adhesive compositions where it is possible to control the timing of debonding, as well as influence the surface from which the adhesive debonds. The present disclosure provides articles comprising two or more components bonded together by a pressure sensitive adhesive composition exhibiting on-demand debonding behavior via the application of a direct current (DC) electric potential, and methods for separating the components. The surface from which the adhesive composition debonds can be influenced by the direction of the electric potential across the adhesive composition. The articles and methods described herein can be used in, for example, advanced manufacturing (e.g., to grip a part, transfer the part to another location, and release the part on demand), device maintenance (e.g., to debond an adhesively secured access panel), and/or recycling for economic or environmental benefits (e.g., to separate components that require different recycling processes).

In one embodiment, the present disclosure provides an article comprising: a first component having a first electrically conductive surface; a second component having a second surface; and an adhesive composition disposed between the first electrically conductive surface and the second surface, the adhesive composition comprising a zwitterionic polymer, wherein the adhesive composition joins the first component to the second component, and wherein the effort required to separate the first component from the second component, as measured by work of adhesion per surface area, is reduced by application of a DC electric potential across the adhesive composition.

In another embodiment, the present disclosure provides a method for separating components in the composite article, the method comprising applying the DC electric potential across the adhesive composition to separate the first component from the second component.

As used herein, the term “zwitterionic polymer” or similar terms means a polymer having at least one anionic moiety and at least one cationic moiety covalently bonded within a single polymer chain. The anionic and cationic moieties are suitably disposed within the polymer backbone, are pendant to the polymer backbone, or a mixture thereof. In some embodiments the anionic and cationic moieties are randomly distributed within a polymer chain; in other embodiments the anionic and cationic moieties are present in an alternating pattern, a block pattern, or another regular or semi-regular pattern within the polymer chain. In some embodiments, the anionic and cationic moieties are present in a 1:1 molar ratio within the polymer chain. In other embodiments, the anionic moieties are present in a molar excess relative to the cationic moieties within the polymer chain. In still other embodiments, the cationic moieties are present in a molar excess relative to the anionic moieties within the polymer chain. In some embodiments, there is a single anionically functional monomer covalently bonded within the zwitterionic polymer; in other embodiments there is more than one anionically functional monomer covalently bonded within the zwitterionic polymer. In some embodiments, there is a single cationically functional monomer covalently bonded within the zwitterionic polymer; in other embodiments there is more than one cationically functional monomer covalently bonded within the zwitterionic polymer. In some embodiments, there are one or more nonionic moieties covalently bonded within the zwitterionic polymer.

As used herein, the term “adhesive composition” means a PSA or composite (e.g., single- or double-sided tape) including a PSA, that comprises a zwitterionic polymer, and optionally one or more additional components blended therewith, that exhibits on-demand debonding behavior when subjected to a DC electric potential. The term “on-demand debonding” means the ability to reduce the strength of an adhesive bond at will for the purpose of facilitating the separation (i.e. debonding) of adhesively joined components.

As used herein, a “pressure sensitive adhesive” is defined to possess the following properties: (1) aggressive and permanent tack; (2) adherence with no more than finger pressure; (3) sufficient ability to hold onto an adherend; and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature. PSAs are adhesives that satisfy the Dahlquist criteria for tackiness, which means that the shear storage modulus is typically $3\times10^5$ Pa (300 kPa) or less when measured at 25° C. and 1 Hertz (6.28 radians/second). PSAs typically exhibit adhesion, cohesion, compliance, and elasticity at room temperature.

As used herein, the term "conductive" and "electrically conductive" are used interchangeably.

As used herein the terms "negative electrode" and "negative adhesive interface" are used interchangeably, and the terms "positive electrode" and "positive adhesive interface" are used interchangeably.

As used herein, the term "polymerizable" is applied to the compounds, also called "monomers", that are polymerizable and/or crosslinkable as a result of initiation by thermal decomposition, redox reaction, or photolysis. Such compounds have at least one α, β-unsaturated site. In some embodiments, monomers having more than one α, β unsaturated site are termed "crosslinkers" but it will be understood that the term "monomer" includes, as appropriate in context, compounds having more than one such site.

As used herein, the term "substantial" or "substantially" means with relatively minor fluctuations or aberrations from the stated property, value, range of values, content, formula, and the like, and does not exclude the presence of additional materials, broader range values, and the like which do not materially affect the desired characteristics of a given composition, article, product, or method.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and in certain embodiments, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "some embodiments" means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

The above summary of the present disclosure is not intended to describe each disclosed embodiment or every implementation of the present disclosure. The description that follows more particularly exemplifies illustrative embodiments.

Figure 1A:
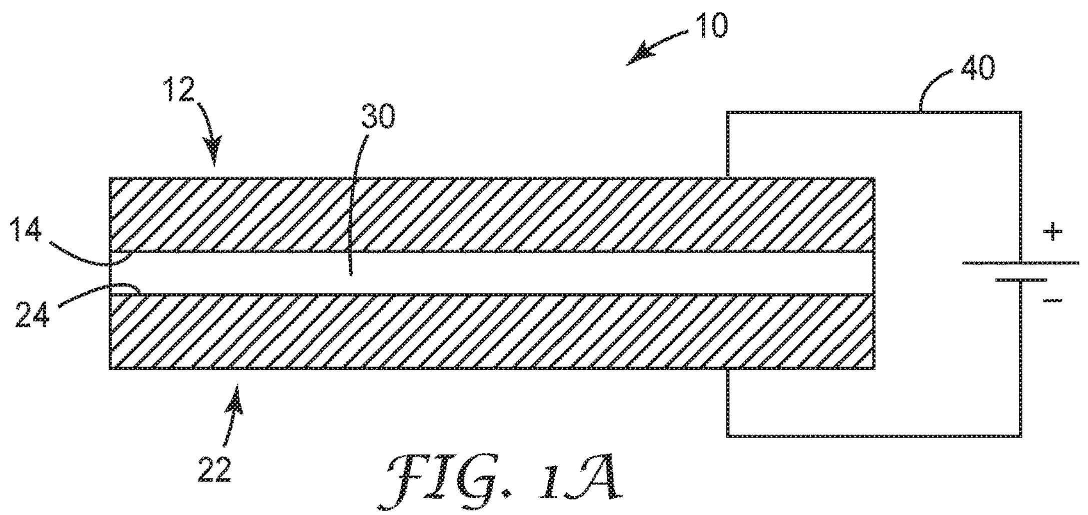
FIG. 1A is a schematic side view of one exemplary article of the present application.

With reference to the figures, like reference numbers offset by multiples of 100 (e.g., 12 and 112 or 30 and 130) indicate like elements. Unless otherwise indicated, all figures and drawings in this document are not to scale and are chosen for the purpose of illustrating different embodiments of the invention. In particular, the dimensions of the various components are depicted in illustrative terms only, and no relationship between the dimensions of the various components should be inferred from the drawings, unless so indicated.

DETAILED DESCRIPTION

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The articles of the present disclosure generally comprise a first component having a first electrically conductive surface, a second component having a second surface, and an adhesive composition disposed between the first electrically conductive surface and the second surface. The adhesive composition (described in more detail below) includes a pressure sensitive adhesive comprising a zwitterionic polymer, and optionally one or more additional components blended therewith, and exhibits on-demand debonding behavior when subjected to a DC electric potential. The effort to separate the first component from the second component as measured, for example, by work of adhesion per surface area according to Test Method 1, is reduce by application of a DC electric potential across the adhesive composition.

The shape and form of the articles in the present disclosure are not particularly limiting. An article can be a finished product or a part for incorporation into, or attachment to, another object. The article is typically made up of at least two components that may be adhesively bonded together, and the article may be two-dimensional or three-dimensional in shape. Similarly, the shape and form of the components making up the article are also not particularly limiting. A component can be a single element or a combination of elements, and the component can be two-dimensional or three-dimensional. In some embodiments, two or more components are interconnected, or even two different sections of the same material (e.g., one end of a composite strip of material can be folded over so as to adhere to the opposite end of the strip).

In order to facilitate the separation of components joined together by the adhesive composition, a DC electric potential is applied across the adhesive composition prior to separation of the components. For example, the electric potential may be applied across two electrically conductive components on opposite sides of the adhesive composition, such that the surface of one component serves as a negative electrode (or negative adhesive interface) and the surface of the other component serves as the positive electrode (or positive adhesive interface). Alternatively, the electric potential may be applied across one electrically conductive component and an electrically conductive adhesive carrier of a two-sided tape, where the surface of the conductive component or the conductive adhesive carrier serves as the negative adhesive interface and the other of the surface of the conductive component or conductive adhesive carrier serves as the positive adhesive interface. Application of a DC current typically weakens the adhesive bond at the negative adhesive interface, thus reducing the amount of effort required to separate components in the article. The location of debonding can be reversed by simply changing the polarity of the electric potential.

FIG. 1 illustrates one embodiment of an article of the present disclosure comprising two electrically conducting components joined together by the adhesive composition. With reference to FIG. 1A, article 10 comprises a first component 12 having a first electrically conductive surface 14 and a second component 22 having a second electrically conductive surface 24. The first and second components 12, 22 are each made from electrically conductive material(s). The nature of the conductive materials is not particularly limiting. In some embodiments, the first electrically conductive surface 14 and second electrically conductive surface 24 are each selected from the group consisting of a metal, a mixed metal, an alloy, a metal oxide, a composite metal, a conductive plastic, a conductive polymer, or combinations thereof. In some embodiments, the composition of the first electrically conductive surface 14 is different from the composition of the second electrically conductive surface 24. In other embodiments, the compositions of the first and second electrically conductive surfaces 14, 24 are the same.

The adhesive composition 30 joins the first and second components 12, 22 together at the first conductive surface 14 and the second conductive surface 24. The adhesive composition exhibits on-demand debonding behavior by application of a DC electric potential across the adhesive composition 30. In this particular embodiment, the first conductive surface 14 serves as the positive adhesive interface and the second conductive surface 24 serves as the negative adhesive interface. Application of a DC electric potential 40 across the adhesive composition 30 results in a weakening of the adhesive bond at the negative adhesive interface (i.e. the second conductive surface 24), as measured, for example, according to the work of adhesion per surface area, thus making it easier to separate the second component 22 from the first component 12. Preferably, little-to-no adhesive residue remains on the second conductive surface 24 after separation. In some embodiments, less then 10%, less then 5%, or less then 1% of the adhesive composition (by weight) remains on the second component 22 after separation. In some preferred embodiments, no adhesive composition remains on the second component 22 after separation. In some embodiments, it is possible to reuse the adhesive composition allowing the first component 12 to be rejoined to the second component 22 or adhered to a completely different component or article. If it is desirable that the adhesive remain on the second component 22 after separation, the polarity of the DC electric potential can be reversed so that the first conducting surface 14 serves as the negative adhesive interface.

Figure 1B:
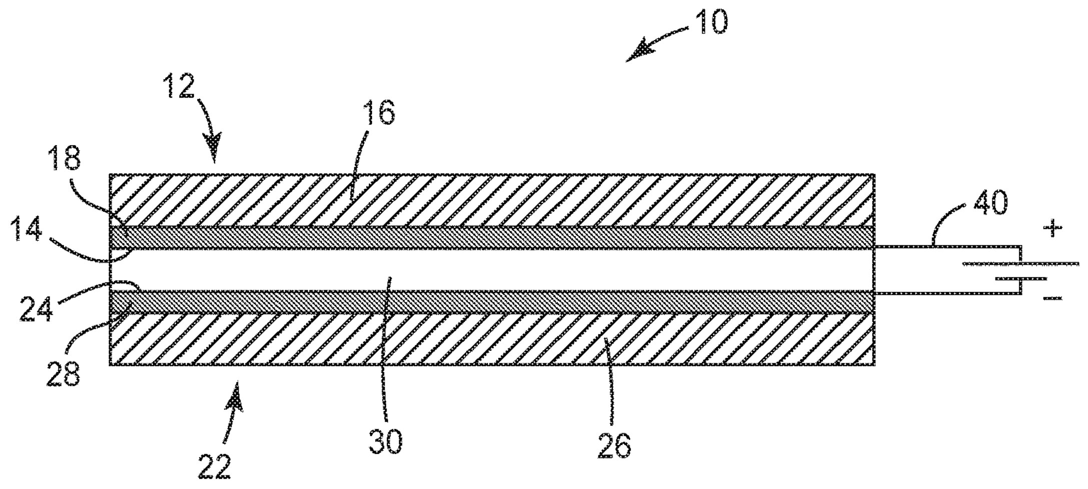
FIG. 1B is a schematic side view of a variation on the article in FIG. 1A.

Electrically conductive components include those components made entirely from electrically conducting material(s), as illustrated in FIG. 1A, as well as those components made from nonconducting material(s) coated with electrically conductive material(s), as illustrated in FIG. 1B. With reference to FIG. 1B, the first component 12 comprises a first nonconductive material 16 and a first electrically conductive coating 18 to provide the first electrically conductive surface 14. Similarly, the second component 22 comprises a second nonconductive material 26 and a second electrically conductive coating 28 to provide the second electrically conductive surface 24. Alternatively (not shown), one of the components could be made entirely of electrically conducting material(s) and the other component could be made of nonconducting material(s) coated with electrically conductive material(s). The conductive coating may only partially coat the component, as illustrated in FIG. 1B, or completely coat the outside surface of the component. For purposes of this disclosure, it is only necessary that the surface of the component in direct contact with the adhesive composition be sufficiently coated to weaken the adhesive bond at the negative adhesive interface when a DC electric potential is applied across the adhesive composition. In some embodiments, the coating is a solid layer. In other embodiments, the coating is pattern coated onto the surface of the component. As noted above, the electrically conductive material is not particularly limiting and can include materials selected from the group consisting of a metal, a mixed metal, an alloy, a metal oxide, a composite metal, a conductive plastic, a conductive polymer, or combinations thereof.

The adhesive composition 30 in FIG. 1B joins the first and second components 12, 22 together. The first conductive surface 14 serves as the positive adhesive interface and the second conductive surface 24 serves as the negative adhesive interface. Application of a DC electric potential 40 across the adhesive composition 30 results in a weakening of the adhesive bond at the negative adhesive interface (i.e. second electrically conductive surface 24), as measured, for example, according to the work of adhesion per surface area, thus making it easier to separate the second component 22 from the first component 12. If it is desirable that the adhesive composition remain predominately on the second component, the polarity of the DC electric potential can be reversed so that the first electrically conducting surface serves as the negative adhesive interface.

Figure 1C:
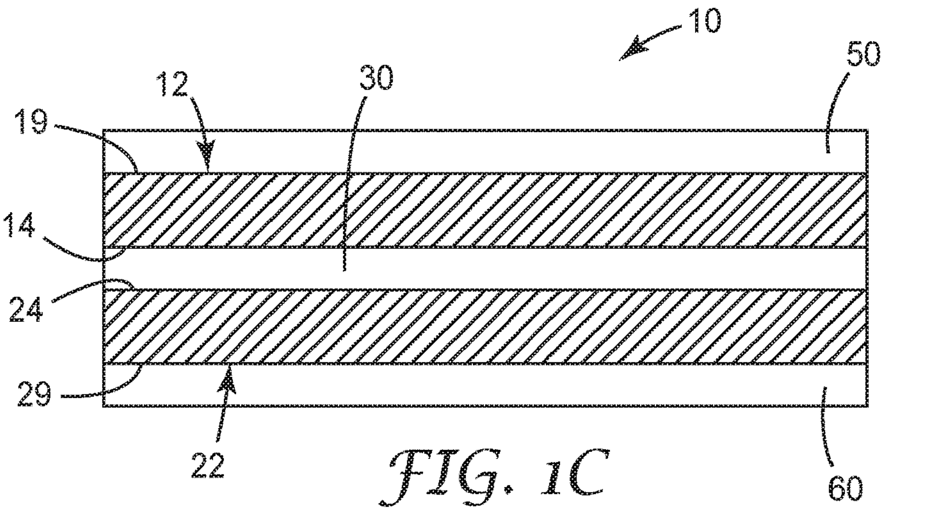
FIG. 1C is a schematic side view of another variation on the article in FIG. 1A.

The articles in FIG. 1A-B can be further adapted to join and subsequently debond nonconductive objects or elements using the adhesive composition, as illustrated in FIG. 1C. The article in FIG. 1C includes a conductive first component 12 having a first electrically conductive surface 14, and a conductive second component 22 having a second electrically conductive surface 24. The first and second components 12, 22 are joined together by the adhesive composition 30. Although the first and second components can be made of electrically conductive material(s), it should also be understood that the first and/or second components can be made from nonconductive material(s) and coated with electrically conductive material(s), such as illustrated in FIG. 1B. FIG. 1C differs from FIGS. 1A-B in that a first outer adhesive 50 is added to a second side 19 of the first component 12 opposite the adhesive composition 30, and a second outer adhesive 60 is added to a first side 29 of the second component 22 opposite the adhesive composition 30. The outer adhesives 50, 60 can be the same or different and are not particularly limiting, as long as the outer adhesives 50, 60 bond to the nonconductive object or element and function for the intended application. In some embodiments, the outer adhesive is a pressure sensitive adhesive. In some further embodiments, the outer adhesive is an adhesive composition, as defined herein. An optional release liner (not shown) may be applied to the first outer adhesive 50, the second outer adhesive 60, or both to protect the outer adhesives during transport and storage of the article. In some embodiments, a release liner is applied to each of the first and second outer adhesives. In other embodiments, a release liner is applied to one of the outer adhesives and the article is wound up on itself so that the other outer adhesive is in direct contact with the release agent of the release liner for the purpose of storage and transport. The adhesive composition can then be unrolled when ready for use. Release liners can be made, for example, of kraft papers, polyethylene, polypropylene, polyester or composites of any of these materials. The liners are preferably coated with release agents such as fluorochemicals or silicones. In some preferred embodiments, the liners are papers, polyolefin films, or polyester films coated with silicone release materials. Examples of commercially available release liners include POLYSLIK™ silicone release papers available from Loparex (Cary, NC), Silicone 1750 coated films from Infiana (Forchheim, Germany), siliconized polyethylene terephthalate films available from H. P. Smith Co. (Stoneham, MA), and 3M Scotchpak™ 9741 Release liner from 3M Company (St. Paul, MN).

In the embodiment illustrated in FIG. 1C, the first and second components are two-dimensional (e.g., sheet or multilayer film). However, it is not necessary, and one can conceive of applications where either one or both of the components is three-dimensional (e.g., special mounting features such as shaped indentation in which to seat the nonconductive object). In practice, one of the optional release liners is removed from the first outer adhesive 50 and the first outer adhesive adhered to a nonconductive object. Then, the second optional release liner is removed from the second outer adhesive 60 and the second outer adhesive 60 adhered to a different nonconductive object, such that the nonconductive objects are adhesively joined. The nonconductive objects can be separated on-demand by application of an electric potential across the adhesive composition, as illustrated in FIGS. 1A-B. In this instance, separation will result in one nonconductive object having the first component adhesively bonded thereto and the other nonconductive object with the second component adhesively bonded thereto.

FIG. 2 illustrates another embodiment of an article 110 of the present application where the adhesive composition is a two-sided tape that joins the first and second components together.

Figure 2A:
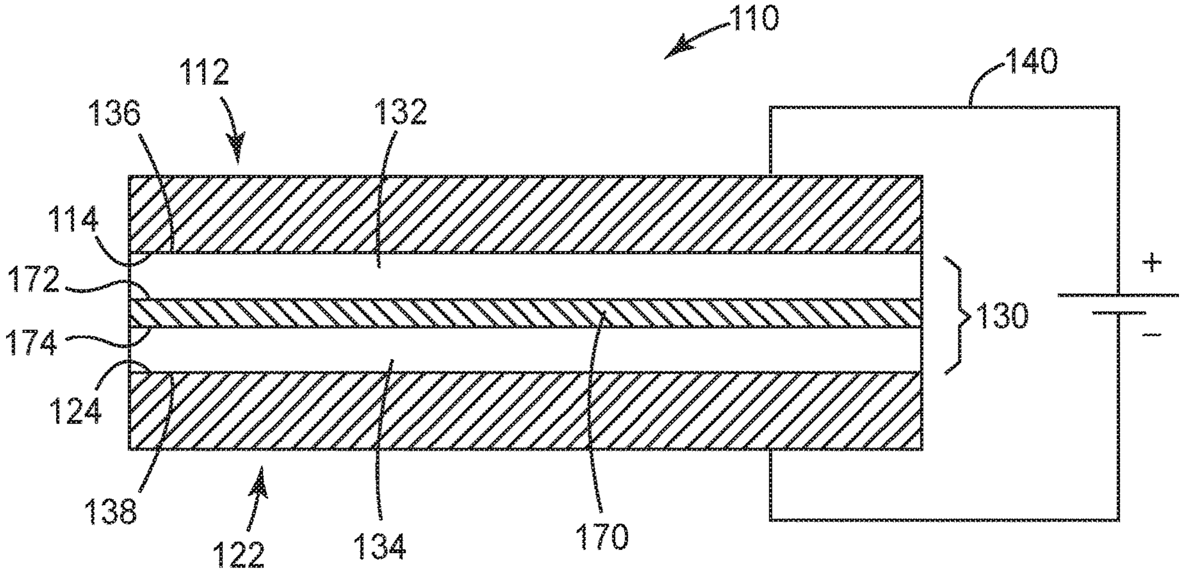
FIG. 2A is a schematic side view of another exemplary article of the present application.

With reference to FIG. 2A, the article 110 comprises a first component 112 having a first electrically conductive surface 114 and a second component 122 having a second electrically conductive surface 124. The first and second components can be made of conductive material(s), as illustrated in FIG. 2A, or one or both of the first and second components can be made of nonconductive material(s) and at least partially coated with electrically conductive material(s), as described above with respect to FIG. 1. The adhesive composition 130 is disposed between the first electrically conductive surface 114 and the second electrically conductive surface 124 and joins the first component 112 to the second component 122.

The adhesive composition 130 is a two-sided adhesive further comprising a carrier 170 having a first major surface 172 and a second major surface 174 opposite the first major surface. A first adhesive composition 132 comprising a first zwitterionic polymer is on the first major surface 172 of the carrier 170. Similarly, a second adhesive composition 134 comprising a second zwitterionic polymer is on the second major surface 174 of the carrier 170. In some embodiments, the composition of the first zwitterionic polymer is the same as the composition of the second zwitterionic polymer. In other embodiments, the composition of the first zwitterionic polymer is different from the composition of the second zwitterionic polymer. A surface 136 of the first adhesive composition 132 opposite the carrier 170 is in contact with the first conductive surface 114 of the first component 112. A surface 138 of the second adhesive composition 134 opposite the carrier 170 is in contact with the second conductive surface 124 of the second component 122.

In some embodiments, the carrier is a porous material that allows for physical contact between the first and second adhesive compositions. Exemplary carriers include paper, woven or nonwoven fabrics, a porous film, a metal mesh, a metal grid, or combinations thereof. In some embodiments, the carrier is electrically conductive. Such conductive carriers may be porous or nonporous and include a metal mesh, a metal grid, a metal foil, a metal plate, a conductive polymer, a conductive foam, a conductive tissue, or combinations thereof.

In the embodiment illustrated in FIG. 2A, the first electrically conductive surface 114 serves as the positive adhesive interface and the second electrically conductive surface 124 serves as the negative adhesive interface. When the carrier is made from a porous material, application of a DC electric potential 140 across the adhesive composition 130 results in a weakening of the adhesive bond at the negative adhesive interface (i.e. second electrically conductive surface 124), as measured, for example, according to the work of adhesion per surface area, thus making it easier to separate the second component 122 from the first component 112. If it is desirable to separate the adhesive composition from the first component, the polarity of the DC electric potential can be reversed so that the first electrically conducting surface serves as the negative adhesive interface.

When the carrier in FIG. 2A is a nonporous conductive material, application of a DC electric potential 140 across the adhesive composition 130 can result in a weakening of the adhesive bond at the negative adhesive interface (i.e. second electrically conductive surface 124) and the first major surface 172 of the carrier 170.

In another embodiment, the carrier 170 is a conductive material that serves as either the positive or the negative adhesive interface during the debonding process. For example, with reference to FIG. 2B, the first conductive surface 114 of the first component 112 is the positive adhesive interface and the first major surface 172 of the carrier 170 is the negative adhesive interface. Application of a DC electric potential 140 across the first adhesive composition 132 will result in separation of the first and second components 112, 122 at the first major surface 172 of the carrier 170. Alternatively, the first component 112 can be removed from the first adhesive composition 132 by reversing the polarity of the DC electric potential.

In an additional embodiment, the conductive surface 124 of the second component 122 or the second major surface 174 of the carrier 170 can be the negative adhesive interface and the other of the conductive surface 124 of the second component 122 or the second major surface 174 of the carrier 170 can be the positive adhesive interface.

Figure 2B:
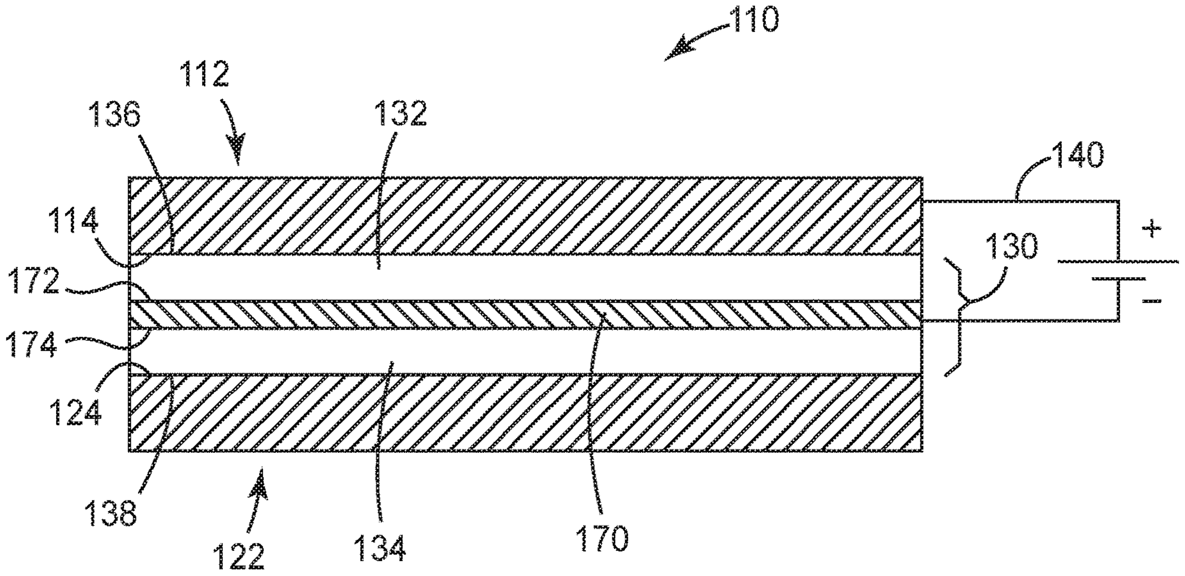
FIG. 2B is a schematic side view of a variation on the article in FIG. 2A.

It should be understood, with reference to FIG. 2B, that when the carrier 170 serves as the negative or positive adhesive interface and the first conductive surface 114 of the first component 112 serves as the other of the negative or positive adhesive interface, only the first adhesive composition 132 across which the DC electric potential is applied need comprise a zwitterionic polymer. The second adhesive composition 134 can in fact be any type of adhesive. Similarly, when the carrier 170 serves as the negative or positive adhesive interface and the second conductive surface 124 of the second component 122 serves as the other of the negative or positive adhesive interface, only the second adhesive composition 134 across which the DC electric potential is applied need comprise a zwitterionic polymer. The first adhesive composition 132 can be any type of adhesive. Therefore, in such embodiments, a two-sided tape may be used to make the article which comprises a carrier having adhesive on both sides, where only one of the adhesives comprises a zwitterionic polymer. This construction would be similar to what is illustrated in FIG. 1C, where the second component 22 is a carrier.

As shown above, a two-sided tape with a conductive carrier allows the user to more strategically tailor the location of debonding within an article. This can be particularly advantageous when it is necessary to remove adhesive from a component prior to recycling and/or leave the adhesive on a component for repositioning or adherence to the same or different article.

Further, by using a two-sided tape with a conductive carrier, at least one of the components need not be conductive in order to separate the first component from the second component. The carrier can serve as one of the electrodes, thus increasing the types of materials that can be included in the article (i.e. adhering two conductive components or adhering a conductive component to a nonconductive component).

The above embodiments illustrate exemplary configurations of the articles of the present disclosure and methods for debonding components within those articles. The adhesive composition, and in particular the PSA of the adhesive composition, will now be described in more detail.

Adhesive Composition

The adhesive composition of the present disclosure includes a zwitterionic polymer, and optionally, one or more additional ingredients. Additional ingredients include one or more adhesion promoters, tackifying agents, surfactants, antifouling agents, thermal or oxidative stabilizers, colorants, adjuvants, plasticizers, solvents, crosslinkers, or mixtures thereof.

The zwitterionic polymers of the present disclosure are copolymers that include the polymerized product of an anionic monomer that is acrylic acid, methacrylic acid, a carboxylic salt thereof, or a blend thereof, a cationic monomer that is an acrylate or methacrylate ester having alkylammonium functionality; and an acrylate or methacrylate ester of an alcohol having between 2 and 18 carbons. Optionally, one or more additional monomers are included in the zwitterionic polymers of the invention. In some embodiments the anionic monomer is acrylic or methacrylic acid and the acid is converted either before or after polymerization to a corresponding carboxylate salt by neutralization. In some embodiments, the acrylic acid, methacrylic acid, or a salt thereof is a mixture of two or more thereof. In some embodiments, the acrylate or methacrylate ester is a mixture of two or more such esters; in some embodiments, the cationic monomer is a mixture of two or more such cationic monomers.

In embodiments, the acrylic acid, methacrylic acid, a carboxylic salt thereof or blend thereof is present in the zwitterionic polymer in amounts of 0.2 wt % to 16 wt %, 0.2 wt % to 10 wt %, 1 wt % to 8 wt %, or 2 wt % to 6 wt % based on the total weight of the zwitterionic polymer, or in various intermediate levels such as 2.3 wt %, 2.4 wt %, 2.6 wt %, 2.7 wt %, and all other such individual values represented by 0.1 wt % increments between 0.2 and 16.0 wt %, and in ranges spanning between any of these individual values in 0.1 wt % increments, such as 0.2 wt % to 9.5 wt %, 1.9 wt % to 6.2 wt %, and the like. These amounts also apply to the amounts of unreacted acrylic acid, methacrylic acid, carboxylic salt thereof or blend thereof in the prepolymer reaction mixture.

The cationic monomer is an acrylate or methacrylate ester including an alkylammonium functionality. In some embodiments, the cationic monomer is a 2-(trialkyl ammonium)ethyl acrylate or a 2-(trialkylammonium)ethyl methacrylate. In such embodiments, the nature of the alkyl groups is not particularly limited; however, cost and practicality may limit the number of useful embodiments. In some embodiments, the 2-(trialkyl ammonium)ethyl acrylate or 2-(trialkylammonium)ethyl methacrylate is formed by the reaction of 2-(dimethylamino)ethyl acrylate or 2-(dimethylamino)ethyl methacrylate with an alkyl halide; in such embodiments, at least two of the three alkyl groups of the 2-(trialkyl ammonium)ethyl acrylate or 2-(trialkylammonium)ethyl methacrylate are methyl. In some embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 10 and 16 carbon atoms. In some embodiments, the cationic monomer is a mixture of two or more of these compounds.

The anion associated with the ammonium functionality of the cationic monomer is not particularly limited, and many anions are useful in connection with various embodiments of the invention. In some embodiments, the anion is a halide anion, such as chloride, bromide, fluoride, or iodide; in some such embodiments, the anion is chloride. In other embodiments the anion is $BF_4$, $N(SO_2CF_3)_2$, $O_3SCF_3$, or $O_3SC_4F_9$. In other embodiments, the anion is methyl sulfate. In still other embodiments, the anion is hydroxide. In some embodiments, the one or more cationic monomers includes a mixture of two or more of these anions. In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the zwitterionic polymer and then the anion is exchanged to provide a different anion. In such embodiments, ion exchange is carried out using any of the conventional processes known to and commonly employed by those having skill in the art.

In embodiments, the cationic monomer is present in the zwitterionic polymer in amounts of 2 wt % to 25 wt %, 2 wt % to 20 wt %, 4 wt % to 16 wt %, 8 wt % to 16 wt %, or 12 wt % to 16 wt % based on the total weight of the zwitterionic polymer, or in various intermediate levels such as 3 wt %, 5 wt %, 6 wt %, 8 wt %, and all other such individual values represented by 1 wt % increments between 2 and 25 wt %, and in any range spanning these individual values in 1 wt % increments, such as 2 wt % to 4 wt %, 7 wt % to 22 wt %, 10 wt % to 16 wt %, and the like. These amounts also apply to the amounts of unreacted cationic monomer in the pre-polymer reaction mixture.

In embodiments, the acrylate or methacrylate ester of an alcohol having between 2 and 18 carbons includes acrylate or methacrylate esters of linear, branched, or cyclic alcohols. While not intended to be limiting, examples of alcohols useful in the acrylate or methacrylate esters include ethyl, propyl, n-butyl, sec-butyl, isobutyl, tert-butyl, hexyl, ethylhexyl, octyl, isooctyl, nonyl, isononyl, decyl, undecyl, and dodecyl alcohol. In embodiments, the alcohol is isooctyl alcohol. In some embodiments, the acrylate or methacrylate ester of an alcohol having between 2 and 18 carbons is a mixture of two or more such compounds.

In embodiments, the acrylate or methacrylate ester of an alcohol having between 2 and 18 carbons is present in the zwitterionic polymer in amount of 50 wt % to 95 wt %, 60 wt % to 90 wt %, or 75 wt % to 85 wt % based on the total weight of the zwitterionic polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt %, and the like. These amounts also apply to the amounts of unreacted acrylate or methacrylate ester of an alcohol having between 8 and 12 carbons in the pre-polymer reaction mixture.

In embodiments, the polymerized product of one or more additional monomers is included in the zwitterionic polymers of the invention. Such additional monomers are not particularly limited by structure, but may be selected to impart to the resulting zwitterionic polymer various desirable properties. The additional monomers may include, in some embodiments, anionic functional monomers. Non-limiting examples of additional monomers are isobutyl acrylate, isobutyl methacrylate, n-butyl acrylate, n-butyl methacrylate, isopropyl acrylate, isopropyl methacrylate, n-propyl acrylate, n-propyl methacrylate, methyl acrylate, methyl methacrylate, ethyl acrylate, ethyl methacrylate, vinyl acetate, N-vinyl pyrrolidone, hydroxyethyl acrylate, or hydroxyethyl methacrylate. In some embodiments, the additional monomer is a mixture of two or more of these monomers. In some such embodiments, the additional monomer is vinyl acetate.

The polymerized product of the one or more additional monomers is present in the zwitterionic polymer in an amount of 0 wt % to 40 wt %, 0 wt % to 30 wt %, 2 wt % to 20 wt %, 3 wt % to 15 wt %, or 5 wt % to 10 wt % based on the total weight of the zwitterionic polymer, or in various intermediate levels such as 1 wt %, 3 wt %, 4 wt %, 5 wt %, 6 wt %, 7 wt %, and all other such individual values represented by 1 wt % increments between 0 wt % and 40 wt %, and in any range spanning these individual values in 1 wt % increments, such as about 2 wt % to 4 wt %, about 11 wt % to 28 wt %, about 7 wt % to 17 wt %, and the like. All such ranges suitably include 0%. These amounts also apply to the amounts of unreacted additional monomers in the pre-polymer reaction mixture.

In some embodiments, the additional monomer has two or more polymerizable functionalities; such monomers are referred to as crosslinkers. Crosslinkers that are useful in forming the zwitterionic polymers include, without limitation, diacrylates such as ethylene glycol diacrylate, hexanediol diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. In some embodiments, the crosslinker is a photoactive crosslinker. Photoactive crosslinkers include, for example, benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine.

In some embodiments the crosslinker, as an additional monomer, is present in amounts up to 10 wt % based on the total weight of the zwitterionic polymer, in other embodiments the polymerized product of the crosslinker is present in the zwitterionic polymer at about 0 wt % to 10 wt % based on the total weight of the polymer, for example at about 0.01 wt % to 5 wt % or about 0.1 wt % to 2 wt %. These amounts also apply to the amounts of unreacted crosslinker in the pre-polymer reaction mixture.

In some embodiments, the zwitterionic polymers of the present disclosure are copolymers that include the polymerized product of methacrylic acid, 2-(dimethylamino)ethyl acrylate methyl chloride, and iso-octyl acrylate. Additionally, some embodiments include vinyl acetate.

The zwitterionic polymers can be made by the process of emulsion polymerization. An emulsion of monomer is formed and polymerization is carried out using UV or thermal initiation of the polymerization reaction. In some embodiments, air is partially excluded or limited during polymerization. The emulsion can be a water-in-oil or an oil-in-water emulsion. In some such embodiments, the emulsion is an oil-in-water emulsion, wherein the one or more monomers are stabilized in a bulk water phase by employing one or more surfactants. In various embodiments, the surfactant is cationic, anionic, zwitterionic, or nonionic in nature and is the structure thereof not otherwise particularly limited. In some embodiments, the surfactant is also a monomer and becomes incorporated within the zwitterionic polymer. In other embodiments, the surfactant is present in the polymerization reaction vessel but is not incorporated into the cationic or zwitterionic polymer as a result of the polymerization reaction.

Non-limiting examples of anionic surfactants useful in forming oil-in-water emulsions of the monomers employed to form the zwitterionic polymers include ammonium, sodium, lithium, or potassium salts of lauryl sulfonic acid, dioctyl sodium sulfosuccinic acid, ammonium, sodium, lithium, or potassium salts of perfluorobutanesulfonic acid, ammonium, sodium, lithium, or potassium salts of perfluorooctanesulfonic acid, ammonium, sodium, lithium, or potassium salts of perfluorooctanoic acid, sodium dodecyl sulfate, sodium dodecylbenzenesulfonate, sodium laureth sulfate, sodium lauroyl sarcosinate, sodium myreth sulfate, sodium pareth sulfate, ammonium, sodium, lithium, or potassium salts of stearic acid, and combinations of one or more thereof.

Non-limiting examples of nonionic surfactants useful in forming oil-in-water emulsions of the monomers employed to form the zwitterionic polymers include block copolymers of ethylene oxide and propylene oxide, such as those sold under the trade names PLURONIC®, KOLLIPHOR®, or TETRONIC®, by the BASF Corporation of Charlotte, NC; ethoxylates formed by the reaction of ethylene oxide with a fatty alcohol, nonylphenol, dodecyl alcohol, and the like, including those sold under the trade name TRITON®, by the Dow Chemical Company of Midland, MI; oleyl alcohol; sorbitan esters; alkylpolyglycosides such as decyl glucoside; sorbitan tristearate; and combinations of one or more thereof.

Non-limiting examples of cationic surfactants useful in forming oil-in-water emulsions of the monomers employed to form the cationic or zwitterionic polymers include benzalkonium chloride, cetrimonium bromide, demethyldioctadecylammonium chloride, lauryl methyl gluceth-10 hydroxypropyl diammonium chloride, tetramethylammonium hydroxide, monoalkyltrimethylammonium chlorides, monoalkyldimethylbenzylammonium chlorides, dialkylethylmethylammonium ethosulfates, trialkylmethylammonium chlorides, polyoxyethylenemonoalkylmethylammonium chlorides, and diquaternaryammonium chlorides; the ammonium functional surfactants sold by Akzo Nobel N. V. of Amsterdam, the Netherlands, under the trade names ETHOQUAD®, ARQUAD®, and DUOQUAD®; and mixtures thereof. Of particular use in forming oil-in-water emulsions for polymerization of the zwitterionic polymers of the invention are the ETHOQUAD® surfactants, for example, ETHOQUAD® C/12, C/25, C/12-75, and the like. In some embodiments, ETHOQUAD® C/25 is usefully employed to make high solids emulsions in water of the monomers employed to make the zwitterionic polymers of the invention.

Where a cationic surfactant is employed in an oil-in-water emulsion polymerization reaction, it is employed in an amount of about 1.0 wt % to 6.0 wt % based on the total weight of the monomers, or at about 2.0 wt % to 4.0 wt % of the monomers, or in various intermediate levels such as 1.1 wt %, 1.2 wt %, 1.3 wt %, 1.4 wt %, 1.5 wt %, 1.6 wt %, 1.7 wt %, 1.8 wt %, 1.9 wt %, 2.1 wt %, 2.2 wt %, and all other such individual values represented by 0.1 wt % increments between 1.0 and 6.0 wt %, and in any range spanning these individual values in 0.1 wt % increments, such as 2.3 wt % to 4.6 wt %, 4.5 wt % to 4.7 wt %, and the like.

Non-limiting examples of zwitterionic surfactants useful in forming oil-in-water emulsions of the monomers employed to form the zwitterionic polymers include betaines and sultaines, such as cocamidopropyl betaine, hydroxysultaine, and cocamidopropyl hydroxysultaine; others include lecithin, 3-[(3-Cholamidopropyl)dimethylammonio]-1-propanesulfonate (CHAPS), and sodium 2-[1-(2-hydroxyethyl)-2-undecyl-4,5-dihydroimidazol-1-ium-1-yl]acetate (sodium lauroamphacetate). Where a zwitterionic surfactant is employed in an oil-in-water emulsion polymerization reaction, it is employed in an amount of about 1.0 wt % to 10.0 wt % based on the total weight of the monomers, or at about 2.0 wt % to 6.0 wt % of the monomers, or in various intermediate levels such as 1.1 wt %, 1.2 wt %, 1.3 wt %, 1.4 wt %, 1.5 wt %, 1.6 wt %, 1.7 wt %, 1.8 wt %, 1.9 wt %, 2.1 wt %, 2.2 wt %, and all other such individual values represented by 0.1 wt % increments between 1.0 and 10.0 wt %, and in any range spanning these individual values in 0.1 wt % increments, such as 2.3 wt % to 4.6 wt %, 4.5 wt % to 4.7 wt %, and the like.

In some embodiments, emulsion polymerization of the monomers employed to make the zwitterionic polymers of the invention is carried out by blending the monomers, surfactant(s), and a UV initiator in water, followed by irradiating with UV radiation at a wavelength corresponding to the preferred decomposition wavelength of the selected initiator for a period of time. In other embodiments, emulsion polymerization of the monomers employed to make the zwitterionic polymers of the invention is carried out by blending the monomers, surfactant(s), and a thermal initiator in water, followed by heating the emulsion to a temperature where decomposition of the thermal initiator is induced at a suitable rate. In some embodiments where methacrylic acid or acrylic acid are employed in the monomer mixture, sodium, lithium, ammonium, or potassium hydroxide is added to the monomer mixture to neutralize the acid functionality and form the corresponding salt. In other embodiments, such neutralization is carried out after completion of the polymerization reaction. Neutralization, in embodiments, means adjusting the pH of the water phase from between about 2 and 3 to between about 4 and 7, for example between about 5 and 6.

In some embodiments, ETHOQUAD® C/25 is usefully employed to make high solids emulsions of the monomers. In this context, "solids" are defined as all ingredients of the emulsion other than water. High solids emulsions are formed, for example, at about 15 wt % and 60 wt % total solids in water, or about 25 wt % to 60 wt % total solids in water, or about 30 wt % to 50 wt % solids in water, or in various intermediate levels such as 16 wt %, 17 wt %, 18 wt %, 19 wt %, 20 wt %, 21 wt %, 22 wt %, 23 wt %, 24 wt %, 26 wt %, 27 wt %, and all other such individual values represented by 1 wt % increments between 15 wt % and 60 wt % solids in water, and in any range spanning these individual values in 1 wt % increments, such as 23 wt % to 46 wt %, 45 wt % to 57 wt %, and the like.

In general, conditions of emulsion polymerization and methodology employed are the same or similar to those employed in conventional emulsion polymerization methods. In some embodiments, the oil-in-water emulsion polymerization is carried out using thermal initiation. In such embodiments, one useful polymerization initiator is V-50 (obtained from Wako Pure Chemical Industries Ltd. of Osaka, Japan). In some such embodiments, the temperature of the emulsion is adjusted prior to and during the polymerization to about 30° C. to 100° C., for example to about 40° C. to 80° C., or about 40° C. to 60° C., or about 45° C. to 55° C. Agitation of the emulsion at elevated temperature is carried out for a suitable amount of time to decompose substantially all of the thermal initiator, and react substantially all of the monomers added to the emulsion to form a polymerized emulsion. In some embodiments, elevated temperature is maintained for a period of about 2 hours to 24 hours, or about 4 hours to 18 hours, or about 8 hours to 16 hours. During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques, such as gas chromatographic analysis of residual monomer content, will inform the skilled artisan regarding the completion of polymerization.

Coating Processes

The adhesive composition comprising the zwitterionic polymer, and optionally, one or more additional components can be coated as an emulsion onto the surface of a component (e.g., carrier, substrate, surface of article, etc.). In some embodiments, an emulsified zwitterionic polymer, at the end of an emulsion polymerization process, is employed as the adhesive composition and is coated “as is” onto one or more components. In such embodiments, water and one or more surfactants employed in the polymerization will remain associated with the adhesive composition, along with any residual unreacted monomers or initiators. The adhesive composition is coated and dried for a period of time sufficient to remove a substantial portion of the water, but in most embodiments the surfactant(s) employed will remain in the dried coating whether or not such surfactants are reacted with and become part of the polymer. Drying of the emulsion will, in some embodiments, also result in removal of some portion or a substantial portion of any unreacted volatile monomers. In some embodiments, one or more additional ingredients are added to the emulsion containing the zwitterionic polymer to form the adhesive composition, and the amended emulsion is employed to coat one or more components and dried to remove a substantial portion of the water and some or a substantial portion of any other remaining volatile components. After drying, it is desirable that the emulsified adhesive composition include no more than 1 wt %, for example between 0.5 wt % and 5 ppm, or between about 500 ppm and 10 ppm, or between about 100 ppm and 1 ppm of unreacted monomers, based on the total weight of monomers added to the emulsion polymerization reaction vessel.

Cationically emulsified adhesive compositions of the invention are characterized by excellent coating viscosity and high shear stability. In embodiments, the viscosity of a cationically stabilized adhesive composition of the present disclosure is between about 20 cP and 2500 cP, or about 100 cP and 1500 cP, or about 400 cP to 1000 cP. The emulsion viscosity is determined in part by the solids content of the emulsion and the molecular weight of the zwitterionic polymer formed. The emulsions are stable under shear stress, such that onset of shear instability occurs at or above at least about 80 Pa, for example between about 90 Pa and 300 Pa, or about 100 Pa and 200 Pa. The viscosity and shear stability of the cationically emulsified adhesive composition of the present disclosure provides broad flexibility in selecting coating methods for coating the adhesive composition onto one or more components. Non-limiting examples of useful coating processes employed in conjunction with the cationically emulsified adhesive composition include knife coating, slot coating, die coating, flood coating, rod coating, curtain coating, spray coating, brush coating, dip coating, kiss coating, gravure coating, print coating operations such as flexographic, inkjet, or screen print coating, and the like. In some embodiments the adhesive composition are coated as a continuous coating; in other embodiments they are pattern coated as described in U.S. Pat. Nos. 4,798,201 and 5,290,615 or using another technique.

Coating of the emulsified adhesive composition is followed by drying using a suitable temperature and period of time for drying that is sufficient to remove a substantial portion of the water and any other volatile substances associated with the emulsion mixture.

In some embodiments, the thickness of the adhesive composition is at least 10 μm, at least 100 μm, at least 500 μm, or at least 1000 μm. In some embodiments, the thickness of the adhesive composition is up to 2 mm, up to 1000 μm, up to 500 μm, or up to 100 μm. In some embodiments, the thickness of the adhesive composition ranges from 10 μm to 2 mm.

In some embodiments, the adhesive composition comprises a zwitterionic polymer, and optionally, one or more additional ingredients. In other embodiments, the adhesive composition is a single-side tape comprising a carrier and the zwitterionic polymer, and optionally, one or more additional ingredients applied to one side of the carrier. In yet other embodiments, the adhesive composition is a double-sided tape comprising a carrier and a first zwitterionic polymer, and optionally, one or more additional ingredients applied to one side of the carrier and a second zwitterionic polymer, and optionally, one or more additional ingredients applied to the opposite side of the carrier. The first and second zwitterionic polymers can be the same or different. Suitable carrier materials are described above.

Applications

The articles of the present disclosure can provide a number of advantages. Components within the article may be separated (i.e. debonded) on-demand. As noted above, on-demand debonding within an article occurs by application of a DC electric potential across the adhesive composition to cause a weakening of the adhesive bond at the negative adhesive interface (i.e. negative electrode), thus decreasing the effort required to separate the components within an article. The weakening of the adhesive bond increases with an increase in DC electric potential (Voltage), an increase in duration of the applied DC electric potential, or a combination thereof. Thus, users can tailor the conditions for on-demand debonding to the application or need. For example, users can increase the duration of the applied DC electric potential when the application calls for lower voltages. In some embodiments, the on-demand debonding occurs with an applied DC electric potential of up to 800 V/mm, of up to 250 V/mm, or up to 90 V/mm. In some embodiments, the on-demand debonding occurs within less than 20 seconds, less than 15 seconds, less than 10 seconds, less than 5 seconds, less than 3 seconds or less than 1.5 seconds after application of the applied DC electric potential.

The weakening of the adhesive bond can be measured, for example, by the % change in work of adhesion per surface area for two components bonded together with the adhesive composition. In some embodiments, the % change in work of adhesion per surface area at 0 V and 50 V for 100 seconds is at least 10%, at least 15%, at least 20%, at least 30%, at least 40%, at least 60%, at least 70%, at least 80%, at least 90%, or at least 95%. In some embodiments, the % change in the work of adhesion per surface area for a component adhesively bonded to an article with the adhesive composition at 0 V and 50 V for 100 seconds ranges from 10% to 100%, from 10% to 99%, from 40% to 99%, from 60% to 99%, from 70% to 99%, or from 80% to 99%. In some embodiments, the DC applied potential is sufficient to completely disengage a component from the article without user intervention.

Another related advantage of the article of the present application is the ability to dictate the location of debondment by the direction of the applied potential across the adhesive composition. Adhesive compositions of the present application typically debond from the negative adhesive interface. Preferably, little-to-no adhesive residue remains on the negative adhesive interface after separation. In some embodiments, less than 10%, less than 5%, or less than 1% of the adhesive composition (by weight) remains on the negative adhesive interface after debonding. In some preferred embodiments, no adhesive composition remains on the negative adhesive interface after debonding. This allows the user to cleanly separate the components at the interface of choice. In some constructions, it may be possible to debond the adhesive composition at one interface during the life of the article and debond the adhesive composition at another interface at the end life of the article, as recycling and environmental regulations may dictate.

Additionally, because the adhesive composition is a PSA, as opposed to a curable adhesive, the debonded adhesive composition typically retains it tack and may be reworked or repositioned as needed, thus exhibiting characteristics often attributed to PSAs with lower peel strength.

The articles of the present application can provide for a variety of on-demand debonding solutions. In robotics, the article may include a mechanical arm coated at one end with the adhesive composition for use in gripping objects (e.g., components) used to perform a variety of tasks. For example, the object may be a screw driver or soldering device. Once the task has been completed, the object can be disengaged by application of an electric potential across the adhesive composition. In some embodiments, the separation could be designed such that the adhesive composition remains on the mechanical arm for gripping a new and different object.

The articles of the present application could be used, for example, in animal tracking collars where researchers must typically sedate an animal both during the application and removal of the collar. Using the articles of the present application, it is possible to create a collar that is designed to fall off at the end of its life cycle. For example, the collar could be secured around the neck of the animal using the adhesive composition. A small battery, which is used to collect the tracking information, could also be used near the end of the collection cycle to apply a potential across the adhesive composition that would then debond the adhesive and allow the collar to fall to the ground. The collar could then be picked up by researchers using a tracking device.

In another application, the article could be used in the packing and shipping industry. The adhesive composition could be used to bundle packages together. Upon arrival at their destination, a carrier employee could apply a current to separate the packages for delivery.

The article may also be a piece of equipment or consumer product comprising one or more components that require periodic service or replacement. For example, a service panel could be adhesively joined to a housing by the adhesive composition and the panel removed by application of a DC applied potential across the adhesive composition. The panel could then be replaced after service and, in some embodiments, repositioned using the same adhesive composition originally applied during manufacture.

The article may also be a multicomponent product that has reached the end of its product lifecycle and at least some, if not all, of the components are recyclable. If the components are joined by the adhesive composition, it is possible to cleanly separate out the recyclable components by application of a DC electric potential across the adhesive composition.

The above applications are not meant to be limiting. The articles and methods of the present application can find use in any variety of applications benefiting from on-demand adhesive debonding.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Unless otherwise noted, all parts, percentages, ratios, etc. in the Examples and the rest of the specification are by weight.

TABLE 1

Materials Used in the Examples

| Material | Abbreviation | Source |
|---|---|---|
| Dimethylaminoethyl acrylate methyl chloride (2-trimethylammoniumethyl acrylate chloride) | DMAEA-MCl | Millipore Sigma, St. Louis, MO |
| Iso-octyl acrylate | IOA | 3M Company, St. Paul, MN |
| Dodecane Acrylate | C12-Acrylate | 3M Company, St. Paul, MN |
| Vinyl Acetate | VAc | Celanese Corp., Dallas, TX |
| Methacrylic acid | MAA | BASF Corp., Ludwigshafen, Germany |
| Cocoalkylmethyl [polyoxy-ethylene (15)] ammonium chloride | EQ-C25 | Akzo Nobel N.V., Amsterdam, the Netherlands |
| Isooctyl thioglycolate | IOTG | Sigma-Aldrich, Burlington, MA |
| 2,2'-Azobis(2-methylpropionamidine) dihydrochloride | V-50 | Wako Pure Chemical Ind., Ltd., Osaka, Japan |
| Deionized Water | DI water | 3M Company, St. Paul, MN |
| N-Vinyl-2-Pyrolidone | NVP | Ashland, Columbus, OH |
| Igepal CA 897 | Igepal CA 897 | Solvay USA Inc., Princeton, NJ |
| Hexanediol Diacrylate | HDDA | Allnex USA Inc., Alpharetta, GA |
| Potassium Persulfate | Potassium Persulfate | PeroxyChem LLC, Philadelphia, PA |
| Tissue Scrim, cellulosic/paper, basis weight 14.5 grams per square meter ($g/m^2$), caliper approximately 30 micrometers (μm) | Tissue | MBL Beijing Biotech Co., Ltd, Beijing, China |

Comparative Example C1. Preparation of Adhesive Formulation with Nonionic Polymer To a stirred reactor DI water (582.3 g), non-ionic surfactant (Igepal CA-897, 17.1 g), and NVP (8.05 g) were added, along with HDDA (0.31 g), and IOA (391.7 g). The components in the reactor were stirred to create an emulsion in the reactor. The resulting emulsion was passed twice through a Manton-Gaulin homogenizer. The homogenized emulsion was returned to the stirred reactor and deoxygenated and heated to 60° C. When the reaction had reached 60° C., potassium persulfate (0.51 g) was added to the reactor. The start of the reaction was signaled by an exotherm, which was allowed to progress to a peak temperature between 90-98° C. The reaction was then allowed to cool to 70° C. and held at that temperature for 2 hours. The mixture was then cooled and filtered to remove any coagulum. The filtered mixture had a solids content of about 40%.

Comparative Examples C2-C3 and Examples E1-E13. Preparation of Adhesive Formulations For each Example, the ingredients DMAEA-MCl, IOA, C12-Acrylate, Vac, MAA, EQ-C25, IOTG, DI water, and V-50 were charged, sequentially and in order, into a clean 32 ounce reaction bottle using the amounts shown in Table 2. The mixture was purged for two minutes with nitrogen. The bottle was sealed and placed in a constant temperature water bath with a rotating devises. The reaction bottle was heated at 50° C. while rotating for 18 hours. The reaction bottle was removed and cooled to room temperature. The reaction mixture was filtered by passing through a screen. No coagulum was obtained. The reaction was then analyzed by gas chromatography (GC) and the % solids was determined. The analysis revealed >99% conversion.

Preparation of Single Layer Transfer Adhesives

The adhesive formulations for Comparative Examples C1-C3 and Examples 1-12 were coated at a wet coat weight of 0.30 millimeters (mm) between silicone treated PET release liners (RF02N/RF32N available from SKC Haas, Seoul, SK). This construction was then dried in a solvent oven (Model LAC 2-12-8, Despatch Thermal Processing Technology, Minneapolis, MN) at 65° C. for 10 minutes.

Preparation of Double-Coated Adhesives with Carrier Layer

The preparation of double-coated adhesive on a tissue carrier layer was conducted in a similar manner to the preparation of single layer transfer adhesives with the following exceptions. The adhesive formulation for Example 13 was coated on silicone treated PET liner at a thickness of 0.1 mm and dried in a solvent oven at 65° C. for 10 minutes. The tissue material was then laminated to the dried adhesive. A second layer of the same adhesive formulation was coated at a thickness of 0.1 mm on top of the tissue side of the construction and then dried in a solvent oven at 65° C. for 10 minutes.

TABLE 2

List of samples, in parts by weight

| Ex. | Carrier | DMAEA-MCI | IOA | C12-Acrylate | VAc | MAA | EQ-C25 | IOTG | V-50 | DI Water |
|---|---|---|---|---|---|---|---|---|---|---|
| C2 | None | 8 | 87 | 0 | 5 | 0 | 1 | 0 | 0.375 | 100 |
| C3 | None | 4 | 89 | 0 | 5 | 2 | 1 | 0 | 0.375 | 100 |
| E1 | None | 8 | 85 | 0 | 5 | 2 | 1 | 0 | 0.375 | 100 |
| E2 | None | 16 | 73 | 0 | 5 | 6 | 1 | 0 | 0.375 | 150 |
| E3 | None | 16 | 75 | 0 | 5 | 4 | 1 | 0 | 0.375 | 150 |
| E4 | None | 16 | 77 | 0 | 5 | 2 | 1 | 0 | 0.375 | 150 |
| E5 | None | 16 | 77 | 0 | 5 | 2 | 1 | 0.03 | 0.375 | 150 |
| E6 | None | 16 | 77 | 0 | 5 | 2 | 1 | 0.05 | 0.375 | 150 |
| E7 | None | 10 | 83 | 0 | 5 | 2 | 1 | 0 | 0.375 | 150 |
| E8 | None | 12 | 81 | 0 | 5 | 2 | 1 | 0 | 0.375 | 150 |
| E9 | None | 16 | 38.5 | 38.5 | 5 | 2 | 1 | 0 | 0.375 | 150 |
| E10 | None | 16 | 0 | 77 | 5 | 2 | 1 | 0 | 0.375 | 150 |
| E11 | None | 14 | 77 | 0 | 5 | 4 | 1 | 0 | 0.375 | 150 |
| E12 | None | 12 | 77 | 0 | 5 | 6 | 1 | 0 | 0.375 | 150 |
| E13 | Tissue | 8 | 85 | 0 | 5 | 2 | 1 | 0 | 0.375 | 100 |

Test Method 1: Work of Adhesion Per Surface Area, with and without Applied Electric Potential The work of adhesion per surface area required to separate two parallel bonded test surfaces was measured while separating the surfaces in the through-thickness direction of the bonding material at a specific rate of removal.

The work of adhesion per surface area is expressed in Newtons per square centimeter of bonded surface times the travelled distance between plates in centimeters (units of N/cm). This was analyzed by integrating the area under the curve of tensile force in Newtons (N) plotted against the change in the gap between the bonded surfaces in centimeters (cm) and then dividing that value by the contact area in square centimeters ($cm^2$) of the bonded test surfaces.

Testing was performed using a strain-controlled rheometer (ARES G2, from TA Instruments, New Castle, Delaware) equipped with an electrorheological accessory. Testing fixtures were 8-mm diameter stainless steel parallel plates. The bottom plate was attached to a water-cooled Advanced Peltier System (APS, from TA Instruments, New Castle, Delaware) for temperature control. Temperature was regulated at 25° C. for all adhesion tests. For application of the electric potential, an arbitrary waveform generator (33210A, from Keysight Technologies, Santa Rosa, California) was connected to a high voltage amplifier (Trek Model 609E-6, from Trek Inc., Lockport, New York) which was connected to the upper geometry on the rheometer. The lower geometry was grounded. This allowed the application of an electric potential in the range of 0 to ±4000 volts direct current (V DC) across a test specimen between the rheometer plates.

For each test, the 8-mm diameter parallel plate fixtures were attached to the rheometer and the gap between the plates was zeroed. An 8-mm diameter disk was cut from the single layer transfer adhesive (for C1-C3 and E1-E12) or the double-coated adhesive (for E13) and one of the release layers peeled away from the coated adhesive and applied to the clean surface of the lower 8-mm diameter stainless steel plate geometry of the rheometer. The second release layer was peeled away from the coated adhesive. Temperature was equilibrated at 25° C. for one minute. Then the upper plate was lowered to contact and compress the adhesive with a compressive load of 5 N for 500 seconds. During the compression step, a DC electric potential was applied during the final 100 seconds of compressive loading, at a voltage of either 0 V DC (as a control test) or −50 V DC. At the end of the compressive loading, the plates were separated at a rate of 0.001 cm/s, and the tensile force required to separate the plates was measured as a function of plate separation distance. Three tests were run for each condition for each Example and averaged to yield the work of adhesion per surface area values reported in Table 3.

The percent (%) reduction in the work of adhesion per surface area was calculated by subtracting the respective average value with −50 V DC applied potential from the corresponding average value with no applied voltage, and then dividing that difference by the value with no applied voltage. A positive value for the % reduction indicates a reduction in the work of adhesion per surface area following application of the −50 V DC electric potential. These % reduction values for each of the Examples are also reported in Table 3.

In the tested examples, negative DC electrical potentials resulted in preferential disbondment from the upper plate, while positive DC electrical potentials resulted in preferential disbondment from the lower (grounded) plate.

Figure 3:
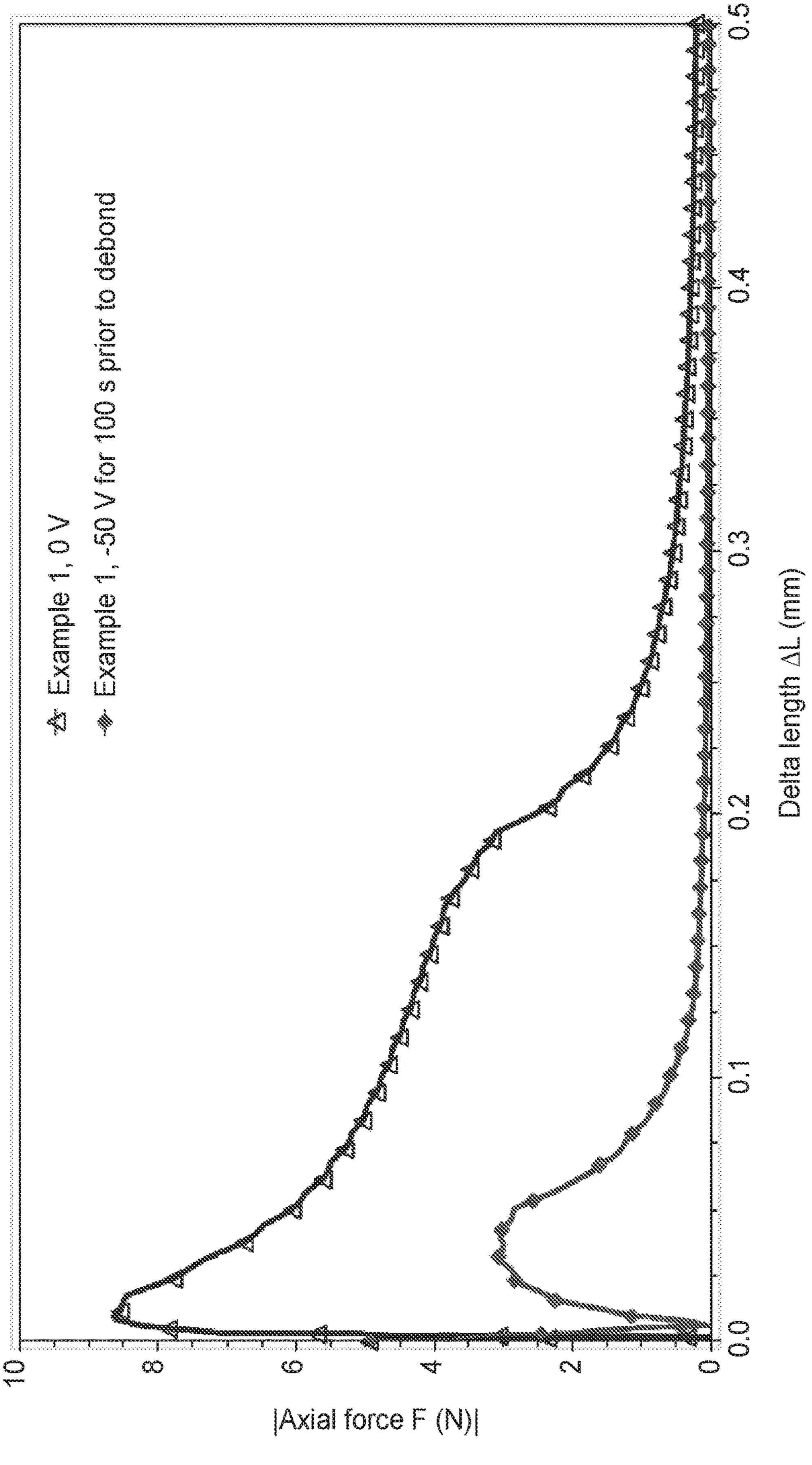
FIG. 3 is a plot of the tensile force in Newtons (y-axis) of Example 1 vs. the distance in millimeters (x-axis) between two 8-mm stainless steel plates being separated at a rate of 0.01 mm/second.

A tensile adhesion profile for Example 1 is illustrated in FIG. 3. The testing was done at 0 V and −50 V of DC electric potential applied during the final 100 second of the compression step. The tensile force in Newton is plotted on the y-axis and the distance between 8-mm diameter stainless steel parallel plates separated at a rate of 0.01 mm/second on the x-axis. Application of the electric potential decreases the bond strength of the adhesive as shown by a reduction in the work of adhesion (described by the area under the curve).

TABLE 3

Tensile Adhesion Results.

| Example | Caliper µm | Tensile Adhesion, Work of Adhesion per Surface Area (N/cm) 0 V | −50 V for 100 s | % reduction |
|---|---|---|---|---|
| C1[a] | 234 | 0.411 | 0.399 | 2.8% |
| C2[a] | 125 | 0.393 | 0.338 | 13.9% |
| C3[b] | 131 | 0.381 | 0.381 | 0.0% |
| E1 | 119 | 0.256 | 0.043 | 83.0% |
| E2 | 108 | 0.015 | 0.003 | 78.2% |
| E3 | 103 | 0.032 | 0.012 | 63.4% |
| E4 | 119 | 0.088 | 0.003 | 96.8% |
| E5 | 141 | 0.305 | 0.021 | 93.2% |
| E6 | 140 | 0.145 | 0.001 | 99.3% |
| E7 | 149 | 0.173 | 0.102 | 41.2% |
| E8 | 123 | 0.202 | 0.058 | 71.1% |
| E9 | 128 | 0.143 | 0.010 | 92.9% |
| E10 | 154 | 0.054 | 0.007 | 87.4% |
| E11 | 116 | 0.088 | 0.058 | 33.9% |
| E12 | 157 | 0.017 | 0.005 | 72.9% |
| E13 | 127 | 0.523 | 0.298 | 42.9% |

[a]Adhesives did not comprise a zwitterionic polymer.

[b]Ionic strength was too low to create a weakness in the adhesive bond.

Figure 4:
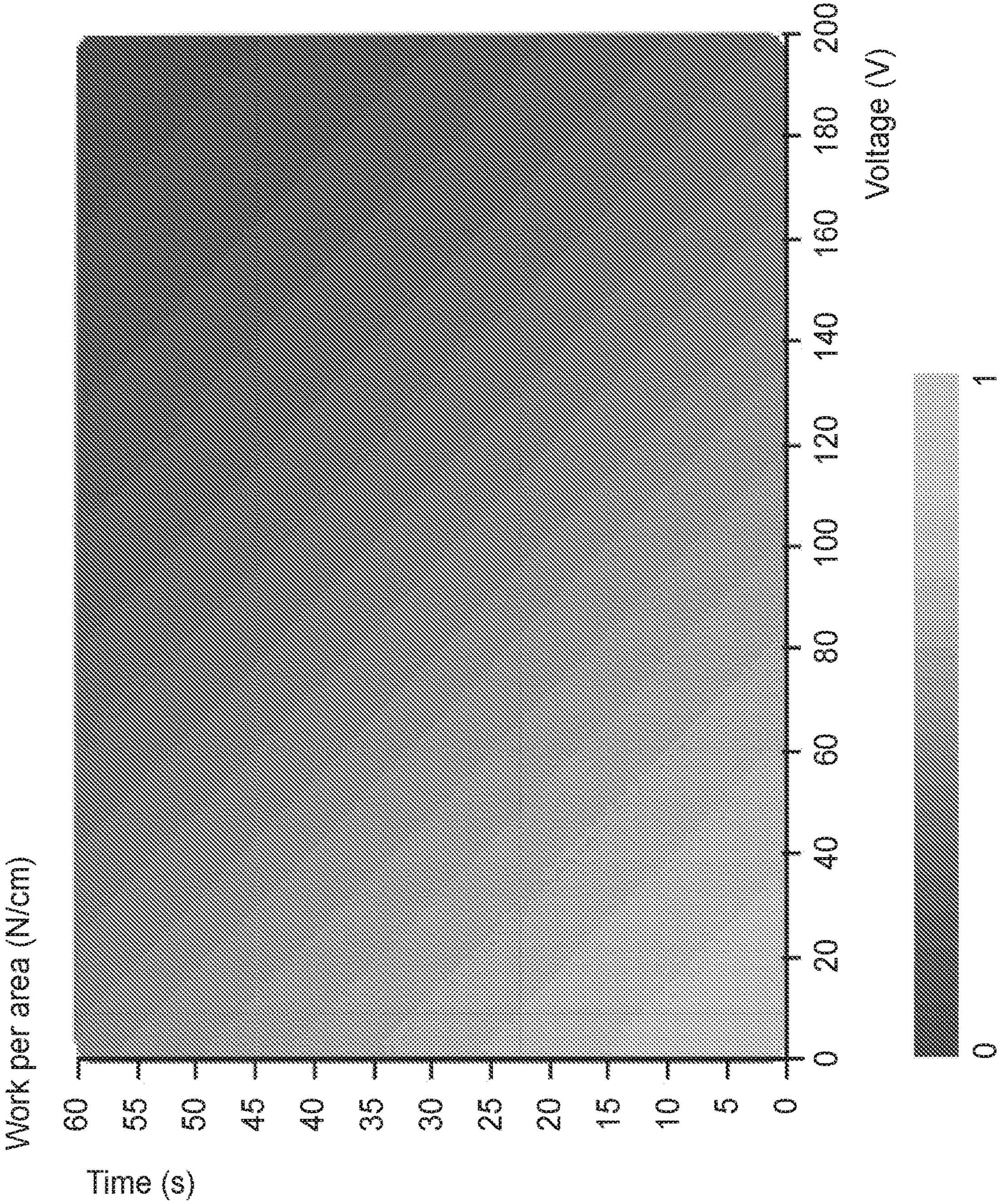
FIG. 4 is a contour surface plot of work of adhesion per unit of surface area (denoted by shading on the scale) from tensile adhesion testing of Example 1, as a function of applied DC voltage (x-axis) and the duration over which the voltage was applied prior to separating the plates (y-axis).

FIG. 4 shows a contour surface plot of work of adhesion per unit of surface area (denoted by the gray scale) from tensile adhesion testing of Example 1, as a function of applied DC voltage (x-axis) and the duration over which the voltage was applied prior to separating the plates (y-axis).

Thus, the present disclosure provides, among other things, articles containing adhesive compositions exhibiting on-demand debonding behavior. Various features and advantages of the present disclosure are set forth in the following claims.

What is claimed is:

1. An article comprising:

a first component having a first electrically conductive surface;

a second component having a second surface; and an adhesive composition disposed between the first electrically conductive surface and the second surface, the adhesive composition comprising a zwitterionic polymer, wherein the adhesive composition joins the first component to the second component, and wherein the effort required to separate the first component from the second component, as measured by work of adhesion per surface area, is reduced by application of a DC electric potential across the adhesive composition; and wherein the zwitterionic polymer consists essentially of the polymerized product of:

a. 0.2 wt % to 16 wt %, based on the total weight of polymer, of anionic monomers comprising acrylic acid, methacrylic acid, a carboxylate salt thereof, or a mixture of two or more thereof, wherein the amount of carboxylate salt is based on the weight of the corresponding free acid;

b. 2 wt % to 25 wt %, based on the total weight of polymer, of one or more cationic monomers comprising an acrylate or a methacrylate ester having alkylammonium functionality;

c. 50 wt % to 95 wt %, based on the total weight of polymer, of one or more nonionic monomers comprising an acrylate or a methacrylate ester of an alcohol having between 2 and 18 carbons; and d. 0 wt % to 40 wt %, based on the total weight of polymer, of more or more additional monomers.

2. The article of claim 1, wherein the acrylate or methacrylate ester including an alkylammonium functionality is the reaction product of 2-(dimethylamino)ethyl acrylate or 2-(dimethylamino)ethyl methacrylate with an alkyl bromide or an alkyl chloride having between 1 and 24 carbon atoms.

3. The article of claim 1, wherein the first component comprises a first nonconductive material and a first electrically conductive coating to provide the first electrically conductive surface.

4. The article of claim 1, wherein the second surface of the second component is a second electrically conductive surface.

5. The article of claim 4, wherein the composition of the first electrically conductive surface is different from the composition of the second electrically conductive surface.

6. The article of claim 4, wherein the adhesive composition is a two-sided adhesive comprising:

a carrier having a first major surface and a second major surface opposite the first major surface, a first adhesive composition comprising a first zwitterionic polymer on the first major surface of the carrier, and a second adhesive composition comprising a second zwitterionic polymer on the second major surface of the carrier, wherein a surface of the first adhesive composition opposite the carrier is in contact with the first electrically conductive surface of the first component, and wherein a surface of the second adhesive composition opposite the carrier is in contact with the second surface of the second component.

7. The article of claim 6, wherein the carrier is a porous material.

8. The article of claim 6, wherein the carrier is an electrically conductive material.

9. The article of claim 6, wherein the composition of the first zwitterionic polymer is the same as the composition of the second zwitterionic polymer.

10. The article of claim 6, wherein the composition of the first zwitterionic polymer is different from the composition of the second zwitterionic polymer.

11. The article of claim 1, wherein the second surface of the second component is a nonconductive surface and the adhesive composition is a two-sided adhesive comprising:

a carrier having a first major surface and a second major surface opposite the first major surface, a first adhesive composition comprising a first zwitterionic polymer on the first major surface of the carrier, and a second adhesive composition comprising a second zwitterionic polymer on the second major surface of the carrier, wherein a surface of the first adhesive composition opposite the carrier is in contact with the first electrically conductive surface of the first component, wherein a surface of the second adhesive composition opposite the carrier is in contact with the second surface of the second component, and wherein the carrier is electrically conductive.

12. The article of claim 11, wherein the carrier is a porous material.

13. The article of claim 1, further comprising a first outer adhesive on a side of the first component opposite the adhesive composition, a second outer adhesive on a side of the second component opposite the adhesive composition, or a combination thereof.

14. The article of claim 13, wherein at least one of the first outer adhesive and second outer adhesive comprises a pressure sensitive adhesive.

15. The article of claim 1, wherein at least one of the first and second components is three-dimensional.

16. The article of claim 1, wherein the effort required to separate the first component from the second component, as measured by the % change in work of adhesion per surface area at 0 V and 50 V for 100 seconds, is at least 15%.

17. A method for separating components in the composite article of claim 1, the method comprising applying the DC electric potential across the adhesive composition to separate the first component from the second component.

18. The method of claim 17, wherein the second surface of the second component is a second electrically conductive surface, the first electrically conductive surface or second electrically conductive surface serves as a negative electrode and the other of the first electrically conductive surface or second electrically conductive surface serves as a positive electrode, the method further comprising applying a DC electric potential so that the adhesive composition debonds from the negative electrode and causes separation of the first component from the second component.

19. The method of claim 17, wherein the adhesive composition is a two-sided adhesive comprising:

a carrier having a first major surface and a second major surface opposite the first major surface, a first adhesive composition comprising a first zwitterionic polymer on the first major surface of the carrier, and a second adhesive composition comprising a second zwitterionic polymer on the second major surface of the carrier, wherein a surface of the first adhesive composition opposite the carrier is in contact with the first electrically conductive surface of the first component, wherein a surface of the second adhesive composition opposite the carrier is in contact with the second surface of the second component, wherein the carrier is electrically conductive, and wherein the first electrically conductive surface or carrier serves as a negative electrode and the other of the first electrically conductive surface or carrier serves as a positive electrode, the method further comprising applying a DC electric potential so that the adhesive composition debonds from the negative electrode and causes separation of the first component from the second component.

* * * * *